United States Patent
Dong et al.

(10) Patent No.: US 10,274,776 B2
(45) Date of Patent: Apr. 30, 2019

(54) COLOR FILM SUBSTRATE, DISPLAY DEVICE, AND MANUFACTURING METHOD OF THE COLOR FILM SUBSTRATE

(71) Applicants: BOE Technology Group Co., Ltd., Beijing (CN); Hefei Xinsheng Optoelectronics Technology Co., Ltd., Hefei (CN)

(72) Inventors: Anxin Dong, Beijing (CN); Jongwon Moon, Beijing (CN); Bin Li, Beijing (CN); Sang Man Yuk, Beijing (CN); Huifang Yuan, Beijing (CN); Tao Zhu, Beijing (CN); Wenhao Tang, Beijing (CN); Haibin Yin, Beijing (CN); Jian Chen, Beijing (CN); Qun Fang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 6 days.

(21) Appl. No.: 15/518,873

(22) PCT Filed: Feb. 5, 2016

(86) PCT No.: PCT/CN2016/073626
§ 371 (c)(1),
(2) Date: Apr. 13, 2017

(87) PCT Pub. No.: WO2017/041430
PCT Pub. Date: Mar. 16, 2017

(65) Prior Publication Data
US 2017/0235186 A1    Aug. 17, 2017

(30) Foreign Application Priority Data
Sep. 7, 2015   (CN) .......................... 2015 1 0564858

(51) Int. Cl.
G02F 1/1333   (2006.01)
G02F 1/1335   (2006.01)
G02F 1/1339   (2006.01)

(52) U.S. Cl.
CPC ...... G02F 1/133514 (2013.01); G02F 1/1339 (2013.01); G02F 1/133512 (2013.01);
(Continued)

(58) Field of Classification Search
CPC ......... G02F 1/133514; G02F 1/133512; G02F 1/133516; G02F 1/1339; G02F 2001/133519
(Continued)

(56) References Cited

U.S. PATENT DOCUMENTS

2002/0089624 A1* 7/2002 Matsumoto ....... G02F 1/133512
349/106
2007/0273821 A1   11/2007 Liou et al.
(Continued)

FOREIGN PATENT DOCUMENTS

CN   101078840 A   11/2007
CN   101726913 A   6/2010
(Continued)

OTHER PUBLICATIONS

Aug. 29, 2017—(CN) First Office Action 201510564858.5 with English Tran.
May 27, 2016—(WO) International Search Report and Written Opinion Appn PCT/CN2016/073626 with English Tran.

*Primary Examiner* — Charles S Chang
(74) *Attorney, Agent, or Firm* — Banner & Witcoff, Ltd.

(57) ABSTRACT

A color film substrate and a method of manufacturing the same, and a display device. The color film substrate includes: a base substrate and a black matrix provided on the base substrate, a through hole or groove is provided in an area of the black matrix to be coated with a sealant, a high (Continued)

impedance material is filled in the through hole or the groove, and an impedance of the high impedance material is higher than that of the black matrix. A display device including the color film substrate mentioned above can solve the problem of a greenish picture of the display panel that caused by the charge release in flush-cut products.

18 Claims, 2 Drawing Sheets

(52) U.S. Cl.
CPC .................. *G02F 1/133516* (2013.01); *G02F 2001/133519* (2013.01)

(58) Field of Classification Search
USPC ........................................................ 349/154
See application file for complete search history.

(56) References Cited

U.S. PATENT DOCUMENTS

2007/0291216 A1\* 12/2007 Chan ..................... G02F 1/1339
349/153
2014/0092497 A1 4/2014 Yuan

FOREIGN PATENT DOCUMENTS

| CN | 202453616 U | 9/2012 |
|---|---|---|
| CN | 102827526 A | 12/2012 |
| CN | 102854656 A | 1/2013 |
| CN | 103926739 A | 7/2014 |
| CN | 103926742 A | 7/2014 |
| CN | 104503131 A | 4/2015 |
| CN | 105182596 A | 12/2015 |
| JP | 2006184740 A | 7/2006 |

\* cited by examiner

COLOR FILM SUBSTRATE, DISPLAY DEVICE, AND MANUFACTURING METHOD OF THE COLOR FILM SUBSTRATE

The application is a U.S. National Phase Entry of International Application No. PCT/CN2016/073626 filed on Feb. 5, 2016, designating the U.S. of America and claiming priority to Chinese Patent Application No. 201510564858.5 filed on Sep. 7, 2015. The present application claims priority to and the benefit of the above-identified applications and the above-identified applications are incorporated by reference herein in their entirety.

TECHNICAL FIELD

Embodiments of the present disclosure relate to a color film substrate, a method of manufacturing the same, and a display device.

BACKGROUND

With the increasing market demand for liquid crystal display panel products having narrow frames and high screen ratio, a flush cutting technology is used in the design of panels to achieve the frame minimization of liquid crystal display panels.

In the design of products for flush cutting, when the common voltage (Vcom) of a display panel is not zero, a color film substrate and a thin film transistor (TFT) array substrate respectively carry positive and negative charges so as to maintain charge balance.

The impedance of black matrix resin used to make the black matrix (BM) of the display panels is generally $10^6$~$10^8$ ohm. If a kind of high impedance (impedance is $10^{13}$~$10^{15}$ ohm) BM resin is used to manufacture display panels, the costs of the display panels will rise by three times and the revenue of products will fall sharply. Meanwhile, due to the problem of the characteristics of high impedance BM resin, the applicable area of the BM resin is smaller and the BM resin cannot be applied to high pixel (Pixels Per Inch, PPI) products.

SUMMARY

Embodiments of the present disclosure provide a color film substrate, a method of manufacturing the same, and a display device, which are used to solve the problem of a greenish picture of the display panel that caused by the charge release in flush-cut products.

In the first aspect, an embodiment of the present disclosure provides a color film substrate, comprising: a base substrate; and a black matrix, provided on the base substrate, wherein a through hole or groove is provided in an area of the black matrix to be coated with a sealant, a high impedance material is filled in the through hole or the groove, an impedance of the high impedance material is higher than that of the black matrix.

In some embodiments, the high impedance material comprises one or more of a blue pixel resin material, a red pixel resin material and a green pixel resin material.

In some embodiments, the color film substrate further comprises: a color film provided on the base substrate; the pixel resin material filled in the through hole or the groove is the same as the pixel resin material of the color film.

In some embodiments, the width of the through hole or the groove is greater than or equal to 10 μm, which is less than the width of the sealant. The thickness (depth) of the through hole is consistent with the thickness of the black matrix. The terms "the thickness of the through hole is consistent with the thickness of the black matrix" means that the thickness of the through hole is less than ±10% of the thickness of the black matrix.

In the second aspect, an embodiment of the present disclosure provides a method of manufacturing the color film substrate, comprising: forming a black matrix material layer on a base substrate, forming a black matrix and a through hole or groove by etching the black matrix material layer, and the through hole or the groove is located in an area of the black matrix to be coated with a sealant; filling a high impedance material in the through hole or the groove, and an impedance of the high impedance material is greater than that of the black matrix.

In some embodiments, the method further comprises: forming a planarization layer on the black matrix.

In some embodiments, the high impedance material includes one or more of a blue pixel resin material, a red pixel resin material and a green pixel resin material.

In some embodiments, filling of a high impedance material in the through hole or the groove, comprising: when forming a color film on the substrate, filling a pixel resin material for preparing a color film in the through hole or the groove.

In some embodiments, when a blue color film layer is treated by using a half tone mask, the through hole or the groove is filled with the blue pixel resin by one patterning process; when a green color film layer is treated by using the half tone mask, the through hole or the groove is filled with the green pixel resin by one patterning process; and when a red color film layer is treated by using the half tone mask, the through hole or the groove is filled with the red pixel resin by one patterning process.

In some embodiments, the width of the through hole or the groove is greater than or equal to 10 μm, which is less than the width of the sealant, and the thickness of the through hole is consistent with the thickness of the black matrix.

In the third aspect, an embodiment of the present disclosure further provides a display device, comprising any of the color film substrates as mentioned above.

According to the above technical details, in the color film substrate and the method of manufacturing the same, and the display device provided by the embodiments of the present disclosure, the black matrix provided on the substrate comprises the though hole or the groove which corresponds to the area of the black matrix to be coated with the sealant, and then and the though hole or the groove is filled with the high impedance material, so as to make the impedance of the filled high impedance material higher than that of the black matrix. Then it is ensured that the charges on the black matrix are not released and the charges of the display device are balanced, and the picture quality of the display device is ensured after flush cutting, so as to solve the problem of a greenish picture of the display device in flush-cut products.

BRIEF DESCRIPTION OF THE DRAWINGS

In order to clearly illustrate the technical solution of the embodiments of the disclosure or the prior art, the drawings of the embodiments will be briefly described in the following; it is obvious that the drawings in the description are only related to some embodiments of the disclosure and for those skilled in the art can further get other drawings according to these drawings without any inventive work.

DESCRIPTION OF DRAWING SIGNS base substrate—31; black matrix—32; sealant—33; through hole—34; high impedance material—35; planarization layer—36; array substrate—37.

DETAILED DESCRIPTION

In order to make objects, technical details and advantages of the embodiments of the disclosure, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure. In addition, the thickness and shape of films in drawings do not reflect the true proportion, and are only schematic illustration of the contents of the disclosure.

Figure 1:
FIG. 1 is a frame structure view of a flush-cut product.
Figure 2:
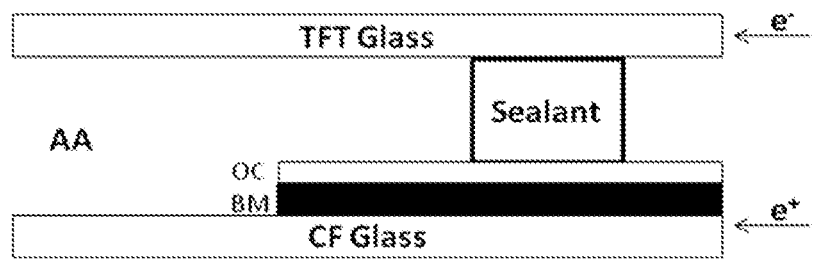
FIG. 2 is a structure view of the display device corresponding to the frame of FIG. 1.

FIG. 1 illustrates a frame design of a black matrix (referred to as BM) of a flush-cut product, and FIG. 2 illustrates a panel structure after the manufacturing process of the liquid crystal display panel has been completed. The BM frame of the flush-cut product as illustrated in FIG. 1 and FIG. 2 is in an integral design. Because the impedance of the BM resin is relatively low, the impedance of the BM resin is generally $10^6 \sim 10^8$ ohm, and the BM in the color film is connected with the outside after flush cutting, which leads to the release of charges in the color film; the charge balance of the display panel is broken and common voltage Vcom changes, which causes the problem of a greenish picture, the picture quality is affect, and the product quality is degraded.

The specific embodiments of the disclosure are further detailed in connection with figures and examples. The following embodiments are used to illustrate the present disclosure only, but are not intended to limit the scope of the present disclosure.

Figure 3A:
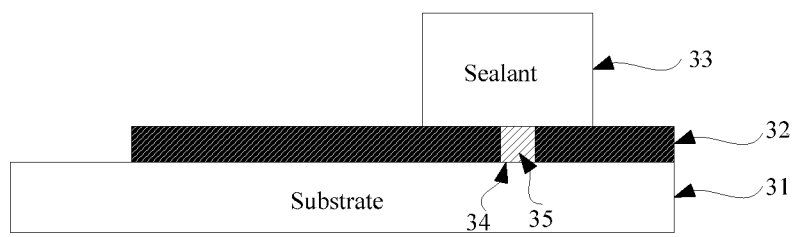
FIG. 3A is a structure view of a color film substrate provided by an embodiment of the disclosure.
Figure 3B:
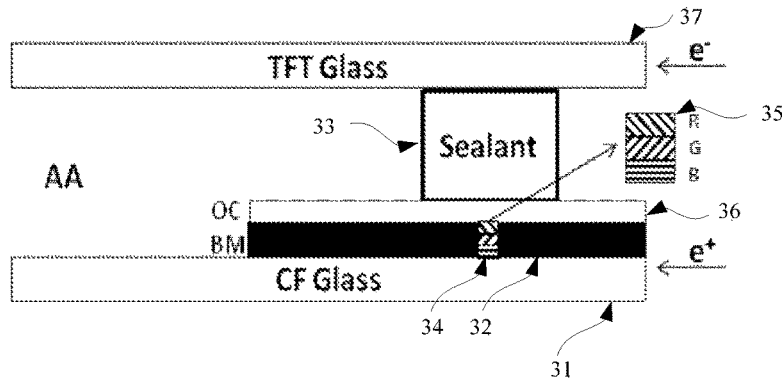
FIG. 3B is a structure view of a color film substrate provided by another embodiment of the disclosure.

FIG. 3A and FIG. 3B illustrate a structure view of a color film substrate provided by an embodiment of the disclosure, respectively. As illustrated in FIG. 3A and FIG. 3B, the color film of each of the embodiments comprises: a base substrate 31 and a black matrix 32 located on the base substrate 31; a through hole 34 is provided in an area of the black matrix 32, in which area sealant 33 is to be coated, or groove (not shown in figures) is formed in the area of the black matrix 32, in which area sealant 33 is to be coated.

A high impedance material 35 is filled in the through hole 34 or the groove, and the impedance of the high impedance material 35 is higher than that of the black matrix 32.

The groove in the embodiment can be understood as a blind hole, and the area in contact with the sealant 33 is an opening area of the blind hole. In this case, the thickness (depth) of the groove is slightly smaller than that of the black matrix 32, and the embodiment can be set according to actual needs.

It should be noted that, the width of the through hole 34 or the groove may be greater than or equal to 10 μm, which is less than the width of the sealant, and the thickness of the through hole 34 is substantially consistent with the thickness of the black matrix. In practical application(s), the width of the through hole or the groove is about 15~23 μm, for example 20 μm. The black matrix in the area to be coated with the sealant is cut off or divided by the through hole or the groove, so as to avoid the direct contact between the black matrix on the both sides of the through hole or the groove.

The embodiments solve the problem that the charge balance is broken due to the low resistivity of the black matrix by means of the resistivity difference between the high impedance material in the through hole or the groove and the black matrix, that is, the embodiments solve the problem of a greenish picture of the display device in the state of art.

At present, the impedance of the resin material can be higher than that of the black matrix. In some examples, the high impedance material in the through hole or the groove employs a resin material. For example, the high impedance material as mentioned above is formed of one or more of a blue pixel resin material, a red pixel resin material and a green pixel resin material for pixels. In some examples, the color pixel resin materials are used. The present embodiments are exemplary, and the embodiments can be selected according to actual needs in practical applications.

In addition, the color film substrate further comprises a color film or color films (not shown in figures) provided on the substrate. The resin material(s) filled in the through hole or the groove is the same as that of the color film(s) in the embodiment. For example, as illustrated in FIG. 3B, the high impedance material which is filled in the through hole or the groove in FIG. 3B can be the stack of the blue pixel resin material, the green pixel resin material, and the red pixel resin material that are sequentially stacked. In this case, the color film is also provided with the blue pixel resin material, the green pixel resin material and the red pixel resin material that are sequentially stacked. In some embodiments, the color film may further comprise a transparent pixel resin material; in this case, the high impedance material filled in the through hole or the groove includes the transparent pixel resin material.

If the resin material filled in the through hole or the groove is the same as that of the color film(s), the preparation process of the color film substrate will not be increased. In other words, the process of filling the resin material(s) in the through hole or the groove is basically the same as the process for forming the color film substrate, so as to ensure that the preparation process is not increased, and then the cost is not increased.

Figure 4:
FIG. 4 is a frame structure view of a flush-cut product provided by another embodiment of the disclosure.

FIG. 3B further illustrates the array substrate 37, that is, after the color film substrate and the array substrate are assembled together to form a cell, the frame structure as illustrated in FIG. 4 can be adopted, and the annular/square notch in the frame is the area corresponding to the through hole in the black matrix of the color film substrate as illustrated in FIG. 3A or FIG. 3B. The black matrix frame is cut off or divided by the annular/square notch, and then the B-G-R resin materials stacked in sequence are filled in the notch. The impedance of the B-G-R resin materials is about $10^{13} \sim 10^{15}$ ohm and is higher than that of the black matrix, which can better ensure that the black matrix frame has no light leakage and the charge balance of the display panel will not be broken, and then the quality of the pictures displayed on the display panel can be ensured.

Specifically, the picture display effect of the frame as illustrated above in FIG. 4 is substantially the same as that of the frame prepared with a high impedance black matrix of high costs.

In the embodiment, the problem of a greenish picture in flush-cut products can be effectively solved, and the high impedance black matrix can be not used to prepare the frame, so as to reduce the cost of flush-cut products.

In addition, as illustrated in FIG. 3B, the color film may further comprise a planarization layer for protecting the black matrix, and the planarization layer can be an overcoating film (OC). The planarization layer 36 is located on the black matrix and below the sealant 33.

In the color film substrate provided by an embodiment, the black matrix provided on the substrate comprises a though hole or groove which corresponds to the area of the black matrix to be coated with a sealant, and the though hole or the groove is filled with a high impedance material as mentioned above, for example, a resin material or resin materials. Therefore, the impedance of the filled resin material is higher than that of the black matrix, and then after flush cutting, the charges on the black matrix cannot be released because the black matrix is cut off, and the charge balance of the display device and the picture quality of the display device can be ensured. Therefore, the problem of a greenish picture in the state of art is solved.

In another aspect, an embodiment of the disclosure further provides a display device, and the display device may comprise the color film substrate as described in any of the embodiments mentioned above.

In addition, FIG. 4 is the frame structure view of the display device, after using the above mentioned color film substrate to prepare the display device in the present embodiment. The frame of the embodiment is not limited to be used in narrow frame products, and may be used in any kinds of display devices, and may be applicable to a variety of sizes of the display devices and liquid crystal display devices.

The display device in the present embodiment can have better display quality. The display device may be: a display panel, an electronic paper, a television, a display, a digital photo frame, a mobile phone, a tablet, or any product or component having a display function.

Figure 5:
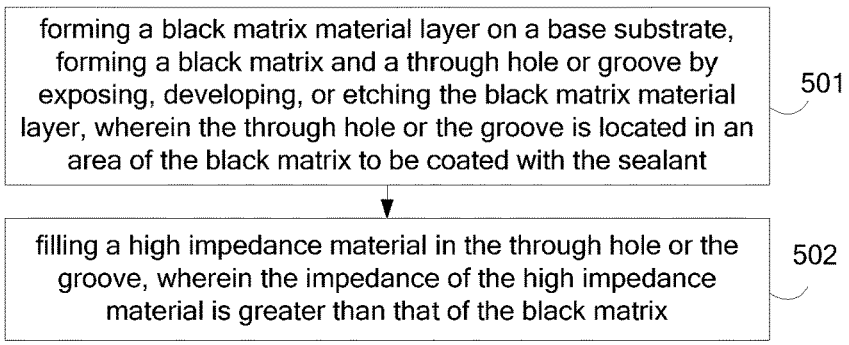
FIG. 5 is a flow chart of a method of manufacturing the color film substrate provided by an embodiment of the disclosure.

In the third aspect, the present disclosure further provides a method of manufacturing the color film substrate. As illustrated in FIG. 5, the method of manufacturing the color film substrate in an embodiment comprises the following steps:

501: forming a black matrix material layer on a base substrate, forming a black matrix and a through hole or groove by exposing, developing, or etching the black matrix material layer, wherein the through hole or the groove is located in an area of the black matrix to be coated with the sealant.

It can be understood that the base substrate on which the black matrix material layer is formed can be exposed by means of a black matrix mask, followed by a developing operation such that the black matrix and the through hole or the groove of the color film substrate are formed on the substrate. That is, the black matrix and the through hole or the groove are formed on the substrate.

In an embodiment, the black matrix mask includes a plurality of preset patterns, and the preset patterns include a totally transparent area and an opaque area.

502: filling a high impedance material in the through hole or the groove, wherein the impedance of the high impedance material is greater than that of the black matrix.

Because the impedance of the resin material is greater than that of the black matrix, in some embodiments, the high impedance material includes a resin material, or uses the resin material. For example, the high impedance material includes one or more of a blue pixel resin material, a red pixel resin material and a green pixel resin material, or is composed of one or more of the blue pixel resin material, the red pixel resin material and the green pixel resin material.

In addition, it should be noted that, in the embodiment, step 502 can be specifically conducted as follows: when forming a color film(s) on the substrate, the through hole or the groove is filled with the resin material(s) configured to prepare the color film(s).

As illustrated in FIG. 3A and FIG. 3B mentioned above, the high impedance material can include the stack of the blue pixel resin material, the green pixel resin material and the red pixel resin material that are sequentially stacked.

In the embodiment, because the film thickness of the resist film formed in a translucent (partially transparent) area is thinner than that of the resist film formed in a totally transparent area of a half tone mask pattern, when a blue color film layer is treated by using a half tone mask, the through hole or the groove is filled with the blue pixel resin by one patterning process.

When a green color film layer is treated by using a half tone mask, the through hole or the groove is filled with the green pixel resin by one patterning process.

When a red color film layer is treated by using a half tone mask, the through hole or the groove is filled with the red pixel resin by one patterning process.

Specifically, the though hole or the groove region corresponding to the translucent area of the half tone mask, and then the film thickness of each resin layer filled in the through hole or the groove can rendered to be relatively thinner than the film thickness of the resin layer for the color film. The thickness of the stack of the blue pixel resin, the green pixel resin and the red pixel resin which are sequentially filled in the through hole or the groove is consistent with the thickness of the black matrix. Generally, the thickness of the black matrix is about more than 1.0 μm.

It should be noted that, the pixel resin layers of plural colors are formed on the substrate step by step. After forming a pixel resin material layer of one color, the pixel resin pattern of the same color is formed by exposing and developing by means of a half tone mask having a pattern, and the pixel resin is correspondingly formed in the through hole or the groove in the frame area as well.

The method mentioned above do not increase the production processes of the color film substrate, that is, the process of filling the resin material in the through hole or the groove is substantially the same as the process for manufacturing the color film in the color film substrate, and only the pattern of the half tone mask is changed.

It should be noted that, a frame notch (as illustrated in FIG. 4) with a width of about 20 μm is formed during the formation of a black matrix. The B/G/R resins corresponding to the position of the BM frame notch can be formed by the half tone mask, the thicknesses of the B/G/R resins filled in the notch can be effectively reduced in the production progress, and the failure that is caused by the great thickness of the stack after the B/G/R resins are stack will not occur.

In some embodiments, in the preparation of the color film substrate, after step 502 mentioned above, the method can further comprise step 503 which not shown in figures:

503: forming a planarization layer on the black matrix (as illustrated in FIG. 3B).

The planarization layer in the embodiment can be an overcoating film (OC). In other embodiments, it is further possible to form photo spacers (PS) on the planarization layer, which may be integrally formed or separately formed with the overcoating film. That is, the color film substrate of the embodiment can be realized on a predetermined product process, and the process flow may include sequentially forming BM-B-G-R-OC (transparent photo spacers).

The method as mentioned above can ensure that the material usage rate is basically unchanged when preparing the color film substrate, thereby ensuring that the cost is not increased and the process of preparing the color film substrate is not increased, thus, it can be better for promotion. Any of the display panels/display devices and the liquid crystal display devices can be prepared by using the above mentioned method of manufacturing the color film substrate.

It should be understood by those skilled in the art that: the embodiments mentioned above are illustrative of the technical details of the present disclosure only and are not intended to be limiting thereof. While the present disclosure has been described in detail with reference to the foregoing embodiments, it should be understood by those skilled in the art that: it is still possible to modify the technical details described in the foregoing embodiments or to replace some or all of the technical features therein. And that such modifications or substitutions do not depart from the spirit of the corresponding claims by the scope of the claims.

The application claims priority to the Chinese patent application No. 201510564858.5, filed Sep. 7, 2015, the entire disclosure of which is incorporated herein by reference as part of the present application.

What is claimed is:

1. A color film substrate, comprising:
    a base substrate; and
    a black matrix provided on the base substrate,
    wherein a through hole is provided in an area of the black matrix to be coated with a sealant, a high impedance material is filled in the through hole, wherein an impedance of the high impedance material is higher than that of the black matrix, and
    wherein a thickness of the high impedance material is consistent with a thickness of the black matrix, so that a surface of the high impedance material away from the base substrate is flush with a surface of the black matrix away from the base substrate.

2. The color film substrate according to claim 1, wherein the high impedance material comprises one or more of a blue pixel resin material, a red pixel resin material and a green pixel resin material.

3. The color film substrate according to claim 2, further comprising a color film provided on the base substrate, wherein a pixel resin material filled in the through hole is the same as a pixel resin material of the color film.

4. The color film substrate according to claim 1, wherein a width of the through hole is greater than or equal to 10 μm, which is less than a width of the sealant, and a thickness of the through hole is consistent with the thickness of the black matrix.

5. The color film substrate according to claim 4, wherein the width of the through hole is 15 μm~23 μm.

6. The color film substrate according to claim 1, wherein the black matrix with the area to be coated with the sealant is cut off by the through hole.

7. A display device, comprising the color film substrate according to claim 1.

8. The color film substrate according to claim 2, wherein a width of the through hole is greater than or equal to 10 μwhich is less than a width of the sealant, and a thickness of the through hole is consistent with the thickness of the black matrix.

9. The color film substrate according to claim 2, wherein the black matrix with the area to be coated with the sealant is cut off by the through hole.

10. A method of manufacturing a color film substrate, comprising:
    forming a black matrix material layer on a base substrate, and forming a black matrix and a through hole by etching the black matrix material layer, wherein the through hole is located in an area of the black matrix to be coated with a sealant; and
    filling a high impedance material in the through hole, wherein an impedance of the high impedance material is greater than that of the black matrix, and wherein a thickness of the high impedance material is consistent with a thickness of the black matrix, so that a surface of the high impedance material away from the base substrate is flush with a surface of the black matrix away from the base substrate.

11. The method according to claim 10, further comprising:
    forming a planarization layer on the black matrix.

12. The method according to claim 10, wherein the high impedance material comprises one or more of a blue pixel resin material, a red pixel resin material and a green pixel resin material.

13. The method according to claim 12, wherein the filling the high impedance material in the through hole comprises:
    when forming a color film on the base substrate, filling a pixel resin material for preparing a color film in the through hole.

14. The method according to claim 13, wherein,
    when a blue color film layer is treated by using a half tone mask, the through hole is filled with the blue pixel resin material by one patterning process;
    when a green color film layer is treated by using a half tone mask, the through hole is filled with the green pixel resin material by one patterning process; and
    when a red color film layer is made by using a half tone mask, the through hole is filled with the red pixel resin material by one patterning process.

15. The method according to claim 12, wherein the black matrix with the area to be coated with the sealant is cut off by the through hole.

16. The method according to claim 10, wherein a width of the through hole is greater than or equal to 10 μwhich is less than a width of the sealant, and a thickness of the through hole is consistent with the thickness of the black matrix.

17. The method according to claim 16, wherein the width of the through hole is 15 μm~23 μm.

18. The method according to claim 10, wherein the black matrix with the area to be coated with the sealant is cut off by the through hole.

* * * * *